Sept. 15, 1953  C. G. GORDON ET AL  2,652,473
ELECTRIC BUTT WELDING
Filed Feb. 12, 1952  2 Sheets-Sheet 1
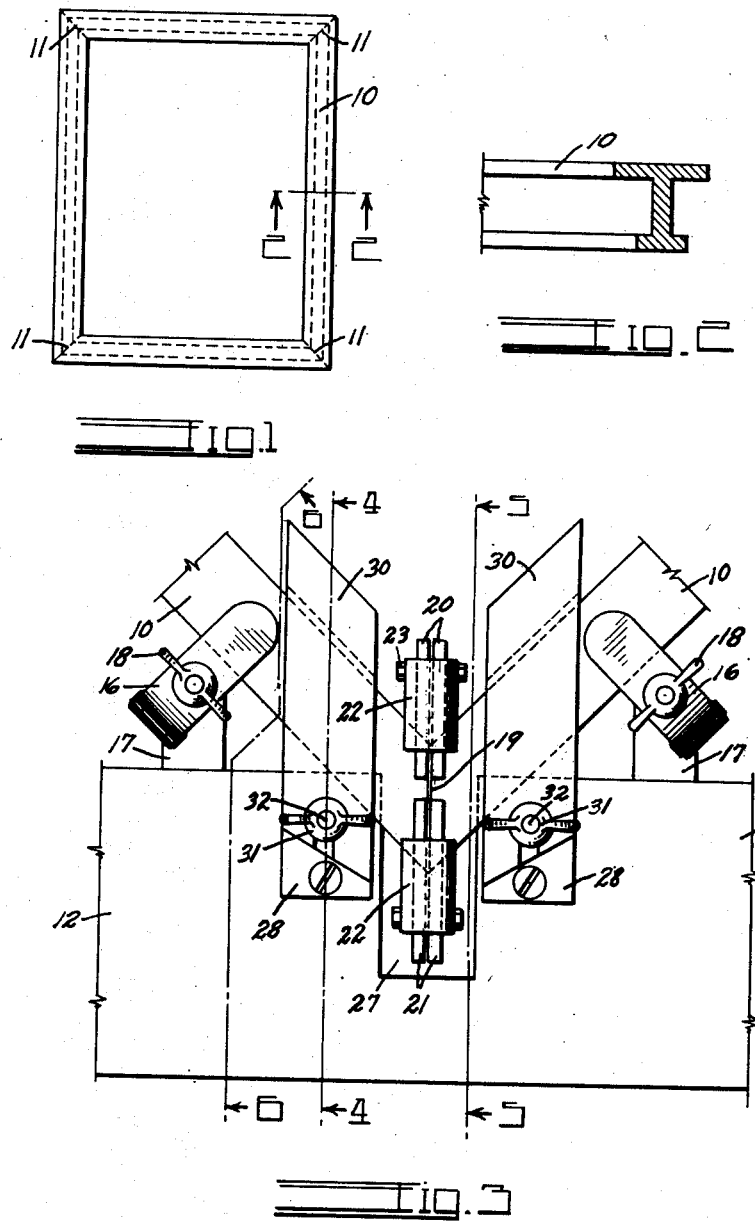
Inventor
CARROLL G. GORDON
ROBERT R. CAMERON
By
Attorney Sept. 15, 1953    C. G. GORDON ET AL    2,652,473
ELECTRIC BUTT WELDING
Filed Feb. 12, 1952    2 Sheets-Sheet 2
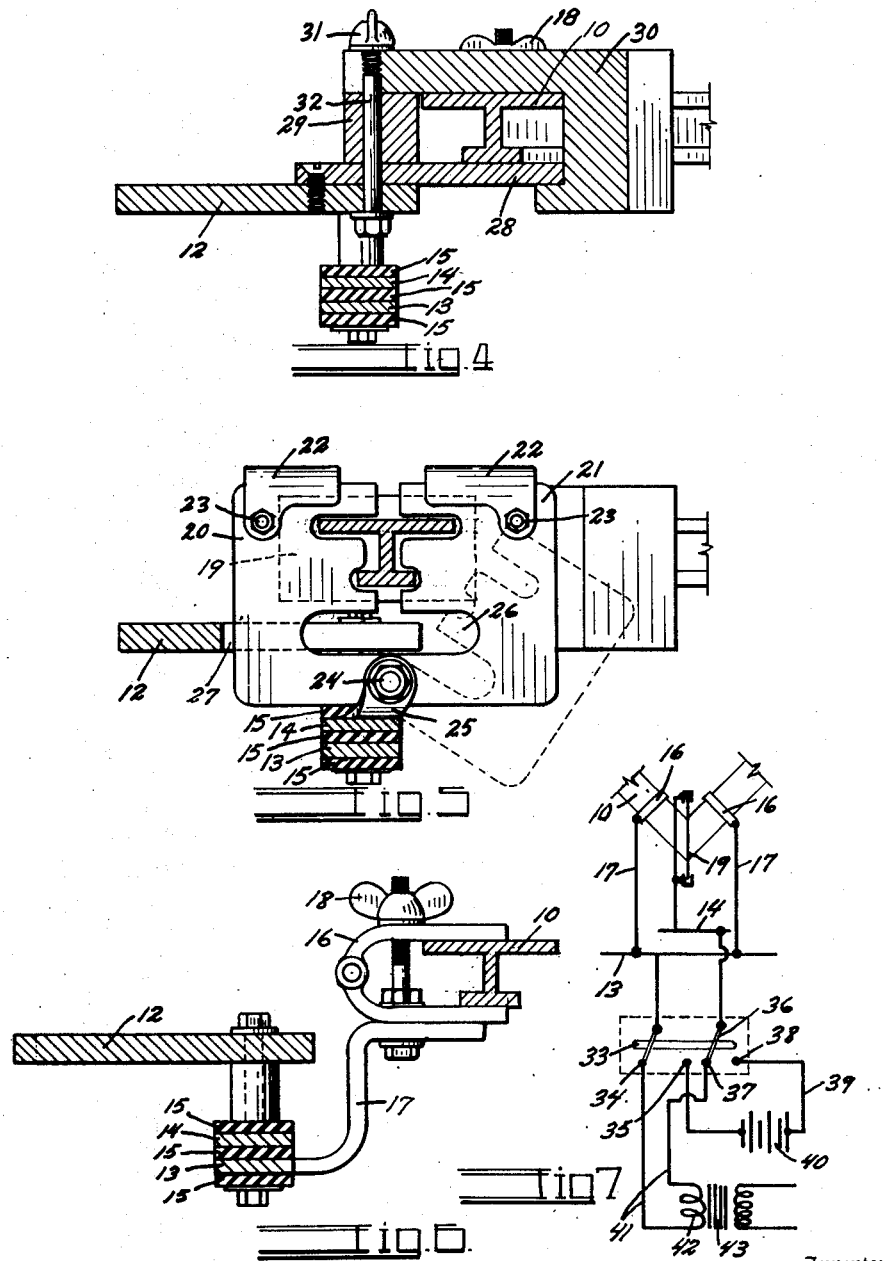
Inventor
CARROLL G. GORDON
ROBERT R. CAMERON
Attorney Patented Sept. 15, 1953

2,652,473

UNITED STATES PATENT OFFICE 2,652,473

ELECTRIC BUTT WELDING

Carroll G. Gordon, Pasadena, Calif., and
Robert R. Cameron, Denver, Colo.

Application February 12, 1952, Serial No. 271,204

6 Claims. (Cl. 219—10)

1

This invention relates to electric butt welding, more particularly to a method and means for welding metal frames such as are used for modern window and door frames and casings, and still more particularly for welding non-ferrous metal frames such as aluminum of various extruded cross-sections. The welding of metal window frames has presented quite a difficult problem. The ordinary methods of electrical resistance butt welding have not been satisfactory for many reasons. First, the metal at the joint, when sufficiently heated to produce a weld, will be deformed by the weld pressure so as to produce a deformation which must be ground away before the glass panes can be inserted. Second, it causes a spattering of the metal at the weld which attaches to the frame and must be removed. Third, it has been difficult to close the fourth joint of a rectangular frame by butt welding due to the fact that the electric current will choose the easier path around the frame rather than across the resistance of the weld.

The principal object of this invention is to provide a method and means for welding metal frames of any metal and any cross-section without upsetting or extruding the metal at the joint, without spattering of the metal and without current flow through the frame when making the final weld therein.

Another object is to provide an electrical metal welding method and means which will produce an exceedingly strong, firm, and integral bond between members of any cross-section and at any desired angle.

A further object is to provide a welding method which will be more economical than present welding methods.

Other objects and advantages reside in the detail construction of the invention, which is designed for simplicity, economy, and efficiency. These will become more apparent from the following description.

In the following detail description of the invention, reference is had to the accompanying drawing which forms a part hereof. Like numerals refer to like parts in all views of the drawing and throughout the description.

In the drawings:

Fig. 1 is a face view of a type of metal frame to which this invention is applicable, illustrating the location of the welds therein;

Fig. 2 is an enlarged cross-section through the frame of Fig. 1, taken on the line 2—2, Fig. 1;

Fig. 3 is a plan view of the improved welding

2 device, illustrating a corner of the frame of Fig. 1 in position therein, ready for welding;

Figs. 4, 5, and 6 are cross-sections through the device of Fig. 3, taken on the lines 4—4, 5—5, and 6—6, respectively; and Fig. 7 is a diagram of the electrical circuits employed in the improved welding method.

The frame of Fig. 1 is designated in its entirety by the numeral 10, and consists of four straight, extruded aluminum members welded together in rectangular relation by means of diagonal corner welds, as indicated at 11. The metal members of the frame 10 may have any desired cross-sections. For the purpose of description a T-shaped cross-section, as illustrated in Fig. 2, has been assumed.

The improved welding device comprises a supporting table plate 12 from which a positive bus bar 13, and a negative bus bar 14, are supported. The bus bars 13 and 14 are separated from each other and from the table plate 12 by suitable insulation 15.

Two contact clamps 16 are supported from the positive bus bar 13 upon suitable current-conducting brackets 17. The clamps may be of any suitable construction. As illustrated, they consist of suitable jaw plates which are actuated by means of wing nuts 18 to firmly engage the metal members of the frame 10 to make firm electrical contact therewith, so as to conduct the welding current thereto.

A relatively thin wafer 19, preferably, but not necessarily, of metal corresponding to the metal of the frame 10 is placed between the two diagonally cut extremities of the frame members. The wafer 19 is supported between two pairs of plates 20 and 21. The plates of each pair of plates are clamped tightly against opposite sides of the extremities of the wafer 19 by any suitable device, such as a hinged, U-shaped clamping clip 22, which can be swung downwardly about the axes of hinge bolts 23 to embrace and wedge the two plates of each pair together. The two pairs of plates are hinged upon a common supporting hinge bolt 24 which is mounted upon a bracket arm 25 extending from the negative bus bar 14. Each pair of plates 20 and 21 is contoured or cut out, as indicated at 26, to follow, in closely spaced relation, the outline or contour of the cross-section of the frame bar. The pairs of clamping plates are positioned in an open notch 27 in the table plate 12.

A magentic field clamp surrounds each frame member in closely spaced relation to the wafer 19 and upon opposite sides of the latter. The magnetic field clamps are positioned between the contact clamps 16 and the wafer 19.

Each magnetic field clamp consists of a supporting plate 28, which is secured on, and projects from, the table member 12; a spacing block 29; and a relatively heavy hook member 30. One extremity of each hook member 30 is hooked beneath the extremity of the adjacent supporting plate 28, and the other extremity of the hook member is clamped tightly against the work and against the adjacent block 29 and the supporting plate 12 by means of a suitable clamp nut 31. Each clamp nut 31 is threaded onto a clamping bolt 32, which also serves to secure the entire field member to the table plate 12. The table plate and the members 28, 29, and 30 are all formed of magnetically permeable material, such as soft iron or electro-magnetic steel, and form two accurately positioned, magnetic cores which completely surround the members of the frame 10 at each side of the wafer 19.

Referring to the circuit diagram of Fig. 7, the positive bus bar 13 is connected to a double-throw switch blade 33 which is arranged to make selective contact with either a first A. C. contact 34 or a first D. C. contact 35. The negative bus bar 14 is similarly connected to a second double-throw switch blade 36 arranged to move in unison with the switch blade 33, and which is arranged to make selective contact with either a second A. C. contact 37 or a second D. C. contact 38. The two switch blades are preferably actuated by any conventional timer equipment (not shown) which will simultaneously throw both blades 33 and 36 from their respective A. C. contacts to their respective D. C. contacts after a predetermined interval of current flow.

The D. C. contacts 35 and 38 are connected by means of suitable conductors 39 to a suitable source of low-voltage, high-amperage, direct current, such as a battery 40. The A. C. contacts 34 and 38 are connected by means of suitable conductors 41 to the low-voltage secondary 42 of a suitable welding transformer 43.

Operation

The two parts to be welded are rigidly clamped in the position of Fig. 3 by means of the magnetic field clamps with the wafer 19 sandwiched therebetween. The contact clamps are now clamped to the members to be welded, and the plates are clamped closed on the extremities of the wafer.

The weld is made in two electrical steps which follow each other almost instantaneously. In the first step, current is first spplied to the transformer 43, with the switch blades 33 and 36 in contact with the A. C. contacts 34 and 37. The heavy alternating current from the transformer secondary flows to the bus bar 13, thence to the two contact clamps 16, thence through the extremities of the two pieces being welded to the wafer 19, thence to the bus bar 14, the switch blade 36, and back to the secondary 42. The energy of the current heats the adjacent extremities of the two work members to a temperature slightly below the melting point of the metal therein. When the latter temperature is reached, the two switch blades 33 and 36 are instantly thrown (either automatically or manually) into contact with the D. C. contacts 34 and 37, respectively.

In the second step, the direct current flows from the battery 40 through the switch blade 33, the bus bar 13, and both contact clamps 16 to the wafer 19, thence to the bus bar 14, the switch blade 36 and conductor 39, back to the battery 40. The latter current quickly raises the temperature at the wafer 19 to the melting point and instantly breaks the D. C. circuit by melting the wafer 19 away from its clamping plates 20 and 21, similarly to the blowing of a fuse.

In the alternating current step the high-amperage alternating current flows in the work pieces through the two magnetic cores or field clamps formed of magnetic metal. This current induces magnetic force in the encircling fields, which in turn induces a counter current in the work pieces at this point to cause a drop in voltage, with a resulting conversion to heat at this point. This greatly increases the heating efficiency, since it increases the electrical resistance at the very extremity which is desired heated. It has been found that an encircling magnetic core about an electrical conductor will increase the heating effect at the encircled part without it being necessary to decrease the cross-section at that part to increase the resistance at the selected area.

When the direct current is applied, the portions adjacent the weld are almost to melting temperature, and since the electrical resistance increases with heat, they are in a maximum resistance state. Therefore, the resistance to the flow of the direct current is high and the heating effect is increased, so that the D. C. current almost instantly liquefies the wafer 19 and the adjacent ends of the work.

The direct current serves another important function by providing a force to carry the metallic atoms in the molten metal between the two work pieces, similarly to the action in an electroplating bath, without the spattering of the metal such as usually occurs with the use of alternating current. The result is a more sound and homogeneous weld.

It will be noted that the difficulty of welding the fourth corner in a frame is entirely eliminated, since no current can flow around the frame. It will also be noted that the wafer provides an automatic timing device, since the current flow will be cut off the instant the entire wafer is molten.

The advantages of the combined alternating and direct current steps and the electro-magnetic heat concentration can also be applied to a direct butt weld without the insert by connecting one bus bar to one piece and the other bus bar to the other work piece. The latter method, however, could not be used on closed frames.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. Means for butt-welding the extremities of two bars together comprising: means for conducting one pole of an electric current source to both bars; means for supporting a relatively thin metal plate of uniform thickness between the extremities of both bars, said plate projecting at its opposite extremities beyond said bars; and means for conducting the other pole of said electric current source to both extremities of said metal plate.

2. A method of welding the abutting extremities of two metallic bars together comprising: connecting the abutting extremities of both bars to one pole of an electric circuit; placing a relatively thin metallic insert between the abutting extremities; connecting the other pole of said electric circuit to the insert; thence passing an electric current through said circuit until the insert fuses and breaks the circuit.

3. Means for welding abutting extremities of metallic bars together comprising: bar clamps adapted to clamp the extremities of the bars in abutting relation; an insert clamp adapted to clamp to the opposite extremities of a relatively thin metal insert and support the latter across and between the extremities of said abutted bars; means connecting one pole of an electric circuit to both said bar clamps; and means for connecting the other pole of the electric circuit to said insert clamp so that current will flow from both said bar clamps to both extremities of said insert clamp.

4. Means for welding the abutting extremities ow two metallic bars together comprising: a current clamp engaging each bar adjacent its abutting extremity; and a magnetically permeable field member surrounding each bar intermediate the current clamp and the abutting extremity thereof.

5. Means for welding the abutting extremities of two metallic bars together as described in claim 3 in which the insert clamp comprises two clamping members electrically connected and hinged together to swing in the plane of the abutting extremities; and means for closing the clamping members on opposite extremities of said insert to support the latter between the abutting extremities of the bars.

6. A method of welding the abutting extremities of metallic bars together comprising: placing a relatively thin metallic insert between the adjacent extremities of said bars; forcing the bars into abutting relation with said insert; connecting one pole of an electric circuit to both bars; connecting the other pole of said circuit to both extremities of said insert; supplying an alternating electric current to said circuit until said insert approaches a fusing temperature; thence simultaneously cutting off the alternating current supply and supplying direct electric current to said circuit until said insert fuses to break the circuit.

CARROLL G. GORDON.
ROBERT R. CAMERON.

References Cited in the file of this patent

UNITED STATES PATENTS

| Number | Name | Date |
|---|---|---|
| 984,719 | Thomson | Feb. 21, 1911 |
| 1,524,907 | Bovard | Feb. 3, 1925 |
| 1,640,798 | Murray | Aug. 30, 1927 |
| 2,108,077 | Robinson | Feb. 15, 1938 |
| 2,250,870 | Jones | July 29, 1941 |
| 2,281,805 | Schenk | May 5, 1942 |
| 2,472,044 | Sciver | May 31, 1949 |

FOREIGN PATENTS

| Number | Country | Date |
|---|---|---|
| 285,513 | Great Britain | May 21, 1929 |
| 854,475 | France | Jan. 19, 1940 |